(12) United States Patent
Velazquez

(10) Patent No.: US 11,125,269 B1
(45) Date of Patent: Sep. 21, 2021

(54) CONNECTING ROD ASSEMBLY TO MODIFY THE PHASES OF AN INTERNAL COMBUSTION ENGINE

(71) Applicant: Luis Alberto Velazquez, Buenos Aires (AR)

(72) Inventor: Luis Alberto Velazquez, Buenos Aires (AR)

(*) Notice: Subject to any disclaimer, the term of this patent is extended or adjusted under 35 U.S.C. 154(b) by 0 days.

(21) Appl. No.: 17/080,928

(22) Filed: Oct. 27, 2020

(51) Int. Cl.
| | |
|---|---|
| *F01M 9/06* | (2006.01) |
| *F16C 9/00* | (2006.01) |
| *F16J 1/08* | (2006.01) |
| *F16C 7/02* | (2006.01) |
| *F02B 75/04* | (2006.01) |
| *F16J 1/14* | (2006.01) |

(52) U.S. Cl.
CPC ............ *F16C 7/023* (2013.01); *F02B 75/044* (2013.01); *F16J 1/14* (2013.01)

(58) Field of Classification Search
CPC ...... F01M 9/06; F01M 2001/066; F16C 9/04; F16C 9/00; F16J 1/08; F16J 7/00
See application file for complete search history.

(56) References Cited

U.S. PATENT DOCUMENTS

| | | | | | |
|---|---|---|---|---|---|
| 4,732,237 | A | * | 3/1988 | Nakano | F01M 9/06 123/196 R |
| 4,765,292 | A | * | 8/1988 | Morgado | F01B 9/026 123/193.6 |
| 4,957,069 | A | * | 9/1990 | Mederer | F01B 9/02 123/197.3 |
| 5,267,536 | A | * | 12/1993 | Imagawa | F01L 1/04 123/41.65 |
| 5,957,118 | A | * | 9/1999 | Tateno | F01M 13/04 123/573 |
| 6,167,990 | B1 | * | 1/2001 | Peng | F01M 11/064 123/196 W |
| 6,725,850 | B2 | * | 4/2004 | Kurasawa | F01M 13/04 123/572 |
| 9,334,797 | B2 | | 5/2016 | Velazquez | |

FOREIGN PATENT DOCUMENTS

AR           085145      9/2013

\* cited by examiner

*Primary Examiner* — Long T Tran

(74) *Attorney, Agent, or Firm* — Defillo & Associates, Inc.; Evelyn A Defillo

(57) ABSTRACT

A connecting rod for an internal combustion engine, the connecting rod including: an upper section; a lower section; a side plate; an oil splatter; the upper section has a Y-shape including a handle and two split ends with a semicircular split angle between the split ends; the handle includes a central bore in an upper end; the lower section has a U-shape with a semicircular angle between split legs of the U-shape; the split legs of the lower section connect via fastening devices to the split ends, the upper section forming an opening having a circular shape; and the circular opening is adapted to connect with a crankshaft of an engine.

6 Claims, 10 Drawing Sheets

CONNECTING ROD ASSEMBLY TO MODIFY THE PHASES OF AN INTERNAL COMBUSTION ENGINE

TECHNICAL FIELD

The present invention belongs to the field of mechanical engineering; specifically, to the field of internal combustion engines. More specifically, the present invention relates to connecting rods for a piston on an internal combustion engine. Even more specifically, the invention relates to a connecting rod that modifies the phases of an internal combustion engine.

BACKGROUND OF THE INVENTION

It is known that before the present invention, an attempt was made to improve the performance of engines by trying to extend the cycles of conventional strokes using extensible connecting rods, damping springs, piston fastening pins that circulated through channels, to have piston races long and short or oval crankshafts and many more variations, but in no case does the prior art show a rectilinear stroke vertical to the axis of the piston cylinder, attached at two points to the piston with the crankshaft through a set of elements namely: a connecting rod chassis, a pivoting support by means of the bolt and with a bolt where the connecting rod itself is held, both points are the connection between the piston and the connecting rod at all times, one of these arms is of variable length and the other fixed, during the entire stroke in one turn of the crankshaft.

In the prior art, there is the application AR085145A1, owned by the applicant, where an extensible connecting rod is shown that has synchronized locks/unlocks, but as you can see, the solution is totally different from the one shown in this application. You can also see several patents prior to the present one where there are extendable connecting rods, to vary the compression ratio and thus save fuel, but no patent speaks of two arms of length, one fixed and the other variable, according to the crankshaft piston support points.

In another of the prior art document, U.S. Pat. No. 9,334,797, has the system for the mechanical conversion of a 4-stroke internal combustion engine into an 8-stroke and which is also from the same applicant, which includes: a dual connecting rod, a support piston with retractable device, and a connecting rod unlocking element, usually located on the crankshaft. That differs from the present one, by not having any type of mechanical drive of the crankshaft for locking and unlocking processes of the system.

BRIEF DESCRIPTION OF THE INVENTION

A connecting rod for an internal combustion engine, the connecting rod including: an upper section; a lower section; a side plate; an oil splatter; the upper section has a Y-shape including a handle and two split ends with semicircular split angle between the split ends; the handle includes a central bore in an upper end; the lower section has a U-shape with a semicircular angle between split legs of the U-shape; the split legs of the lower section connect via fastening devices to the split ends; the upper section forming an opening having a circular shape; and the circular opening is adapted to connect with a crankshaft of a engine.

The present invention includes 2 support points for the piston with the connecting rod, one offset from the vertical axis in the direction of rotation and the other on the opposite side, avoiding the tilting movement of the piston and managing to keep the piston at upper dead center for longer time than in the conventional engine, while the crankshaft continues to rotate and explodes at an angle of greater mechanical efficiency.

DETAILED DESCRIPTION OF THE INVENTION

Figure 1:
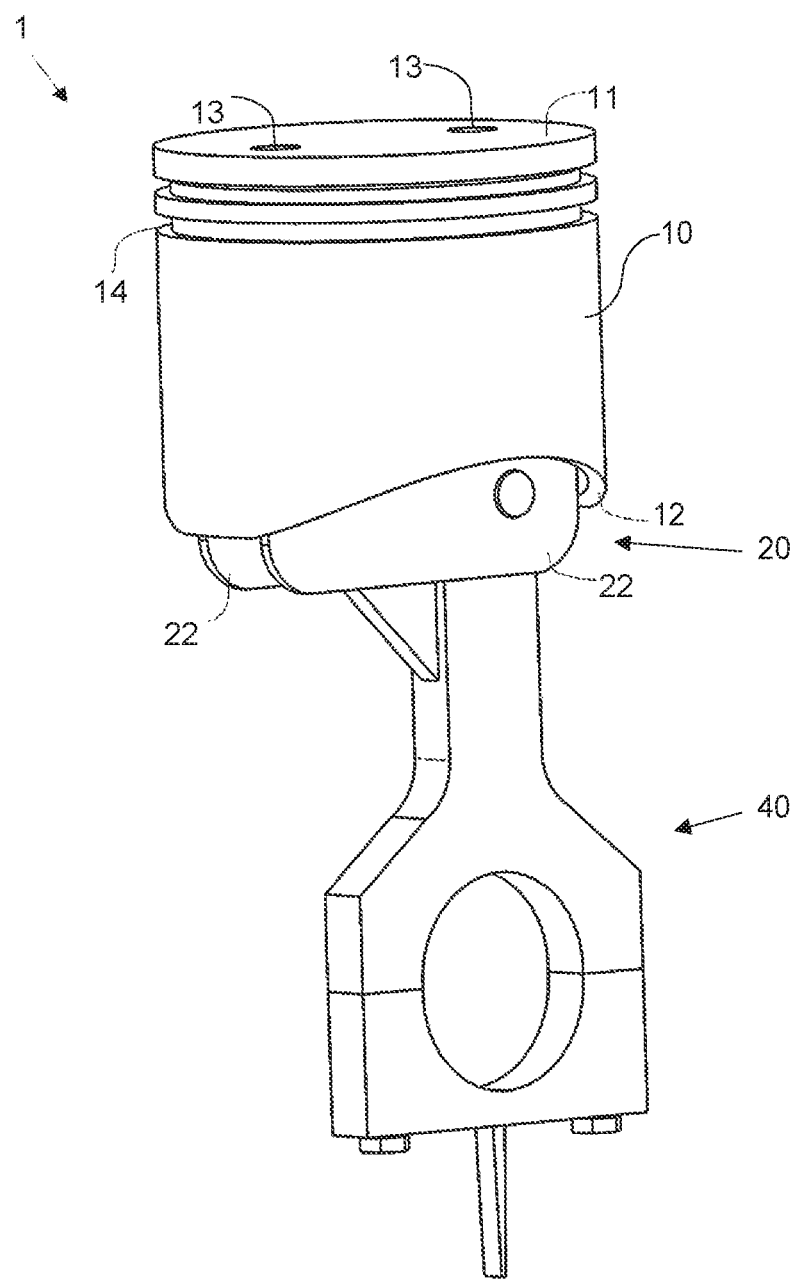
FIG. 1 shows a perspective front view of the connecting rod assembly according to the present invention connected to a piston.
Figure 2:
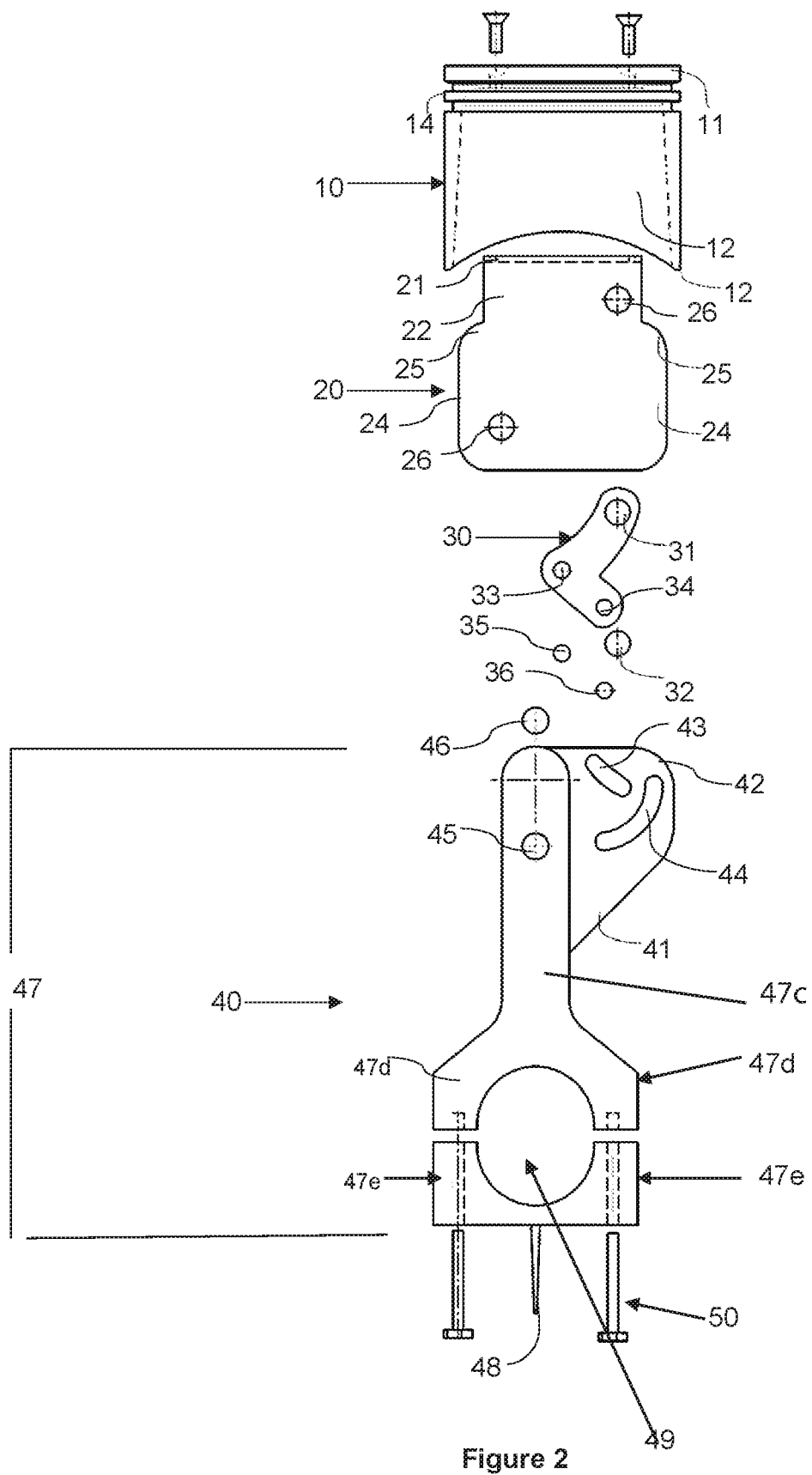
FIG. 2 shows an exploded front view of the connecting rod and piston of FIG. 1.
Figure 3:
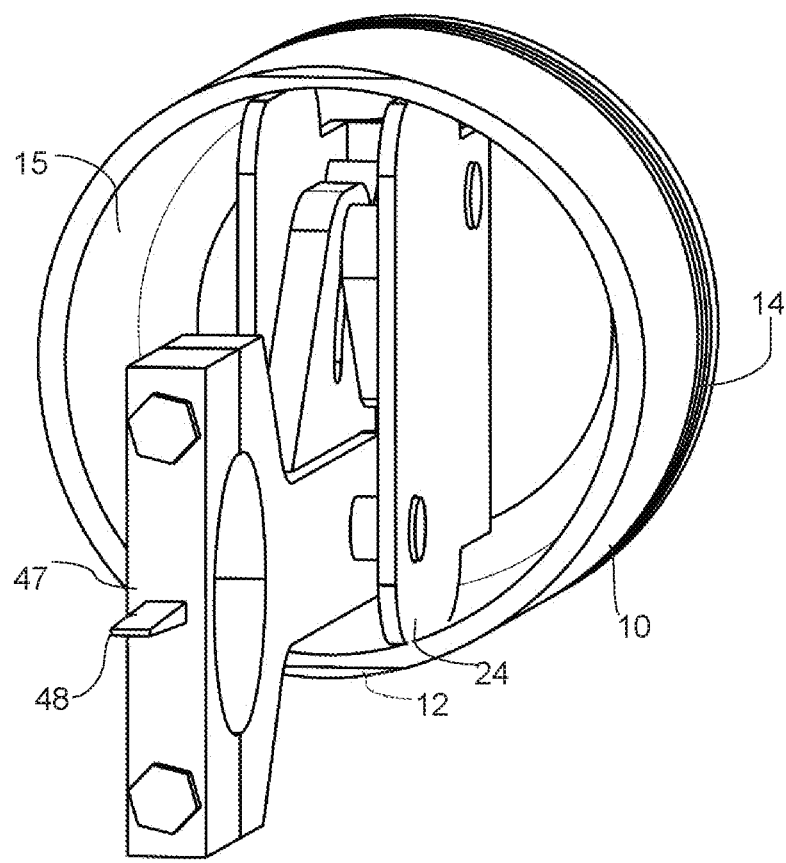
FIG. 3 shows a bottom view of the piston and connecting rod of FIG. 1.
Figure 4:
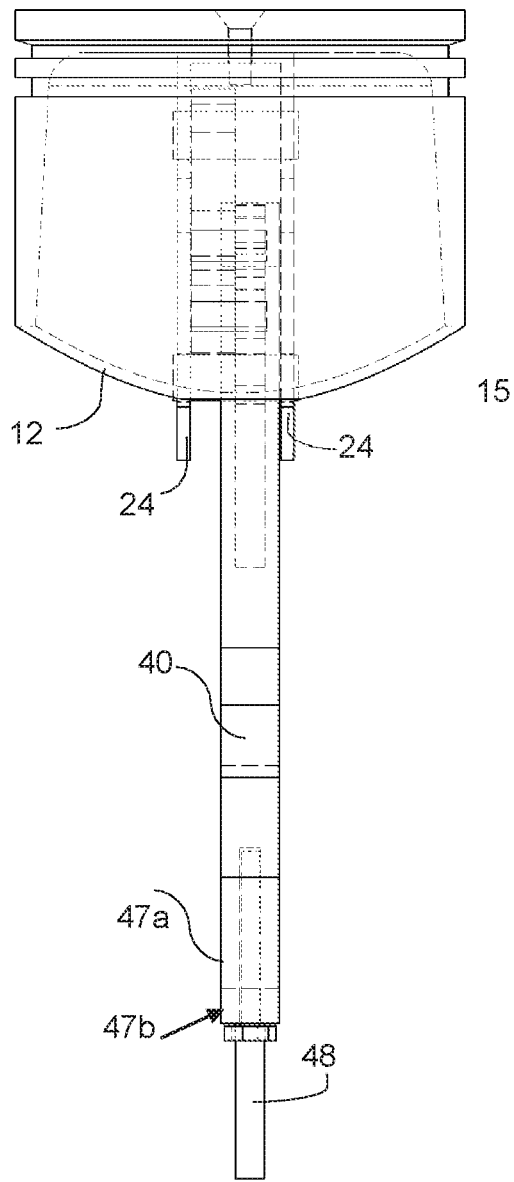
FIG. 4 shows a front view of the piston and connecting rod of FIG. 1.
Figures 5A, 5B:
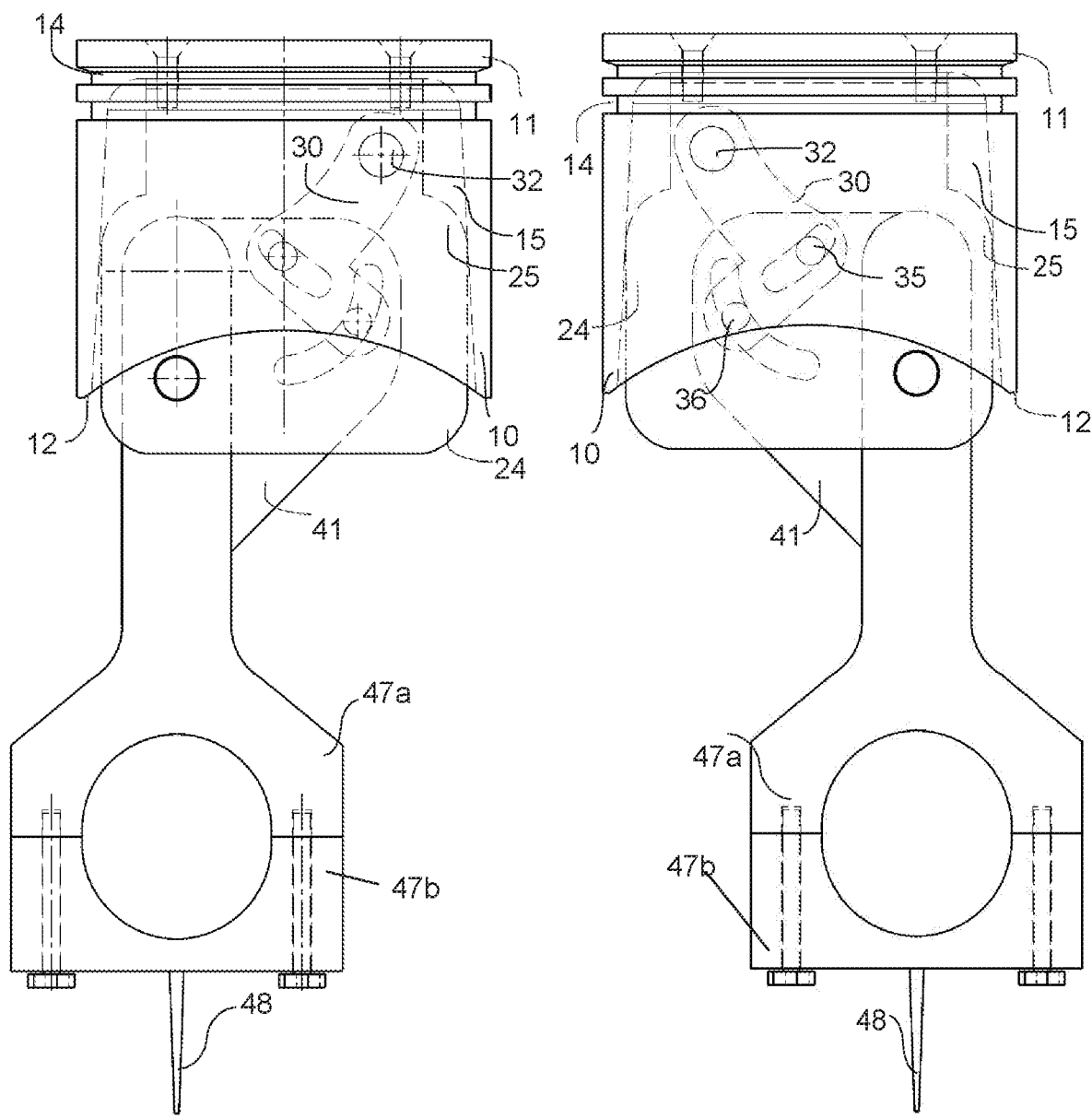
FIG. 5A shows a right-side view of the piston and connecting rod of FIG. 1.
FIG. 5B shows a left-side view of the piston and connecting rod of FIG. 1.
Figures 6A, 6B:
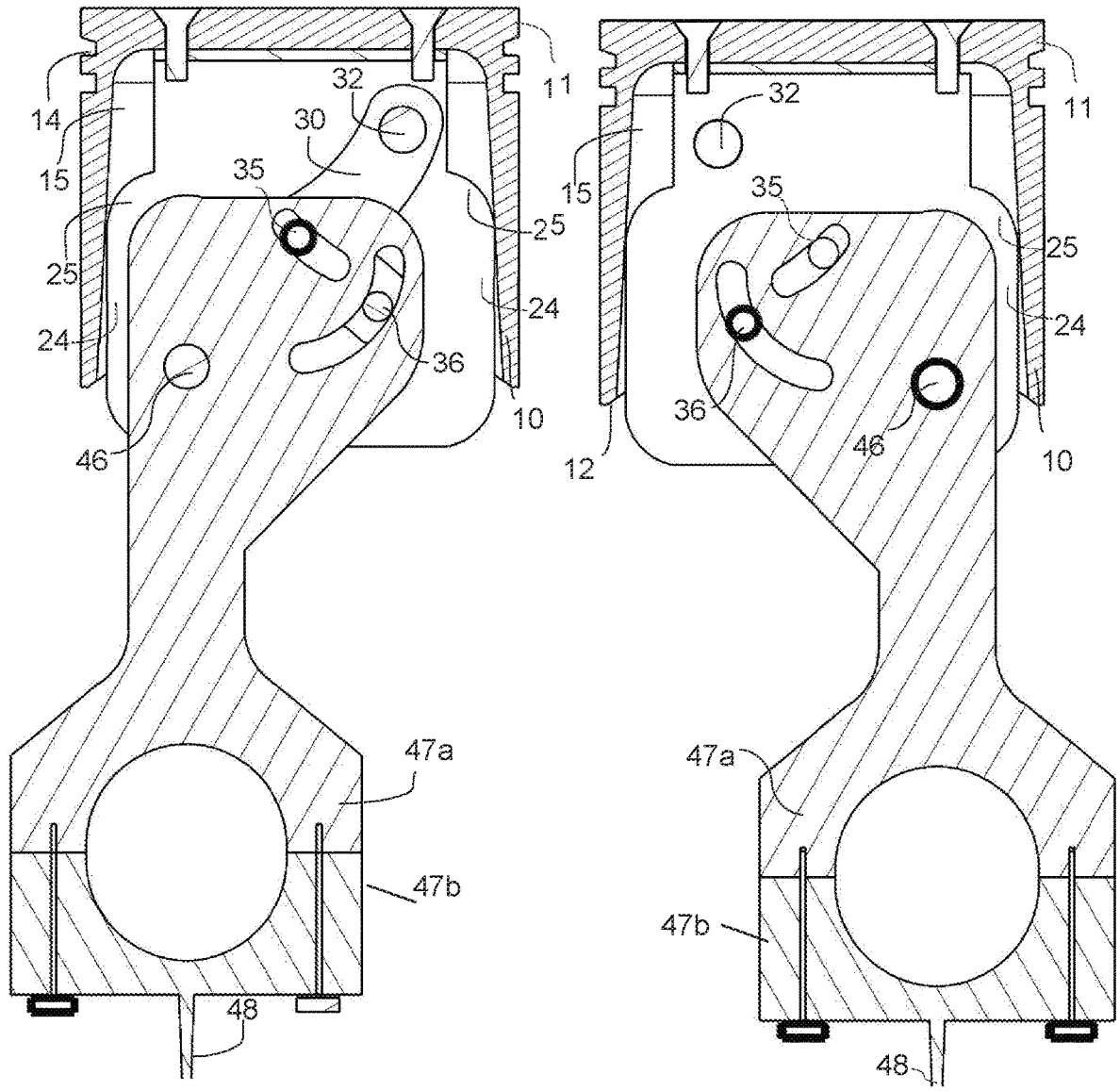
FIG. 6A shows a sectional side view of the piston and connecting rod of FIG. 5A.
FIG. 6B shows a sectional side view of the piston and connecting rod of FIG. 5B.
Figure 7:
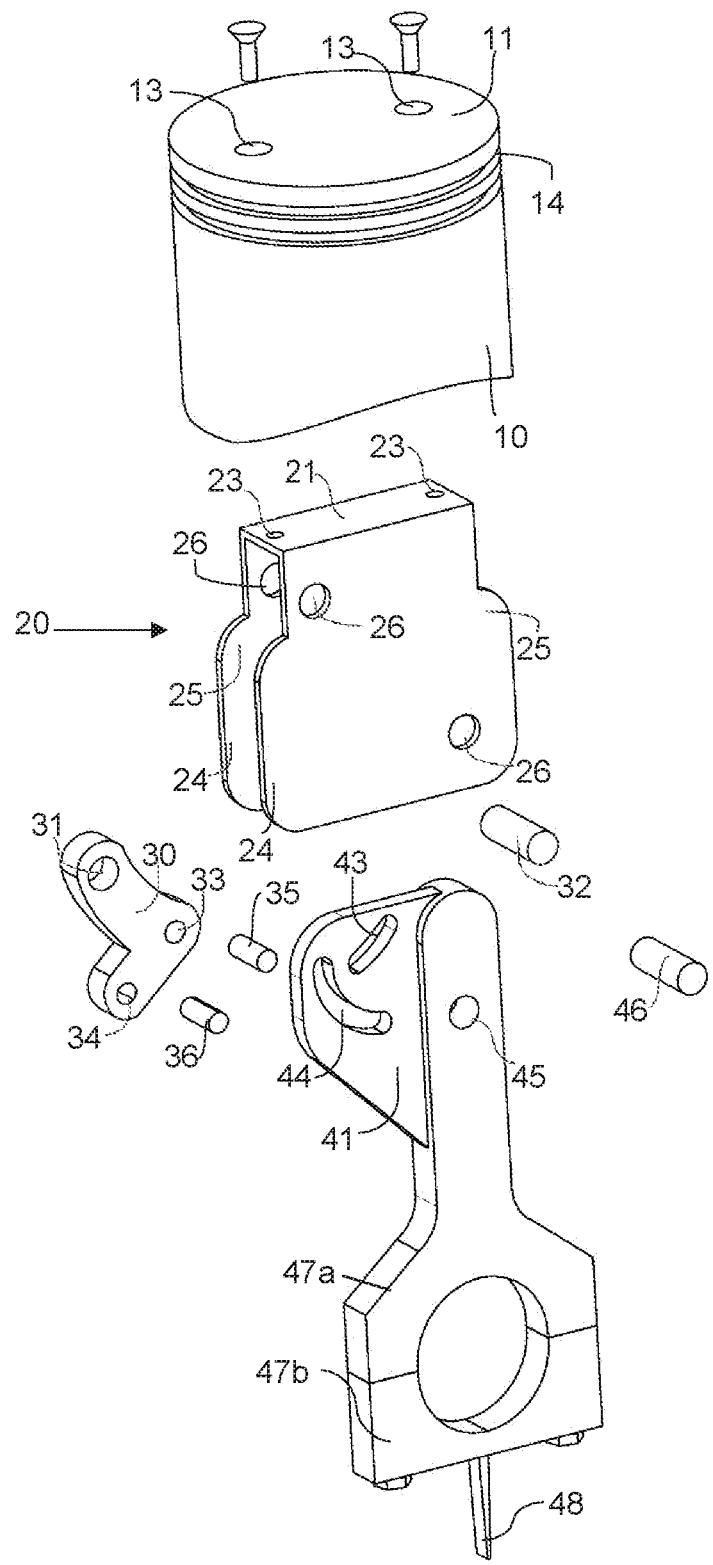
FIG. 7 shows an exploded perspective front view of the piston and connecting rod of FIG. 1.
Figures 8A, 8B, 8C, 8D:
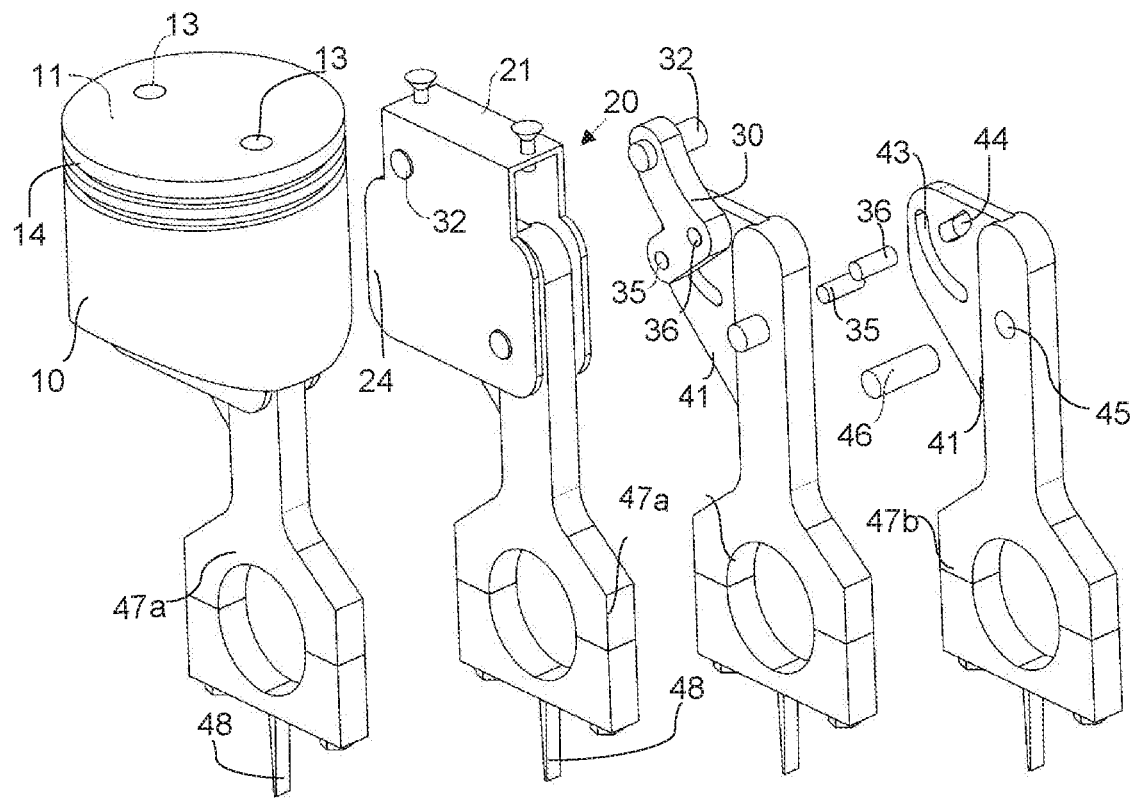
FIGS. 8A-D show a perspective front view of the assembly of the piston and connecting rod showing the different components.
Figures 9A, 9B, 9C:
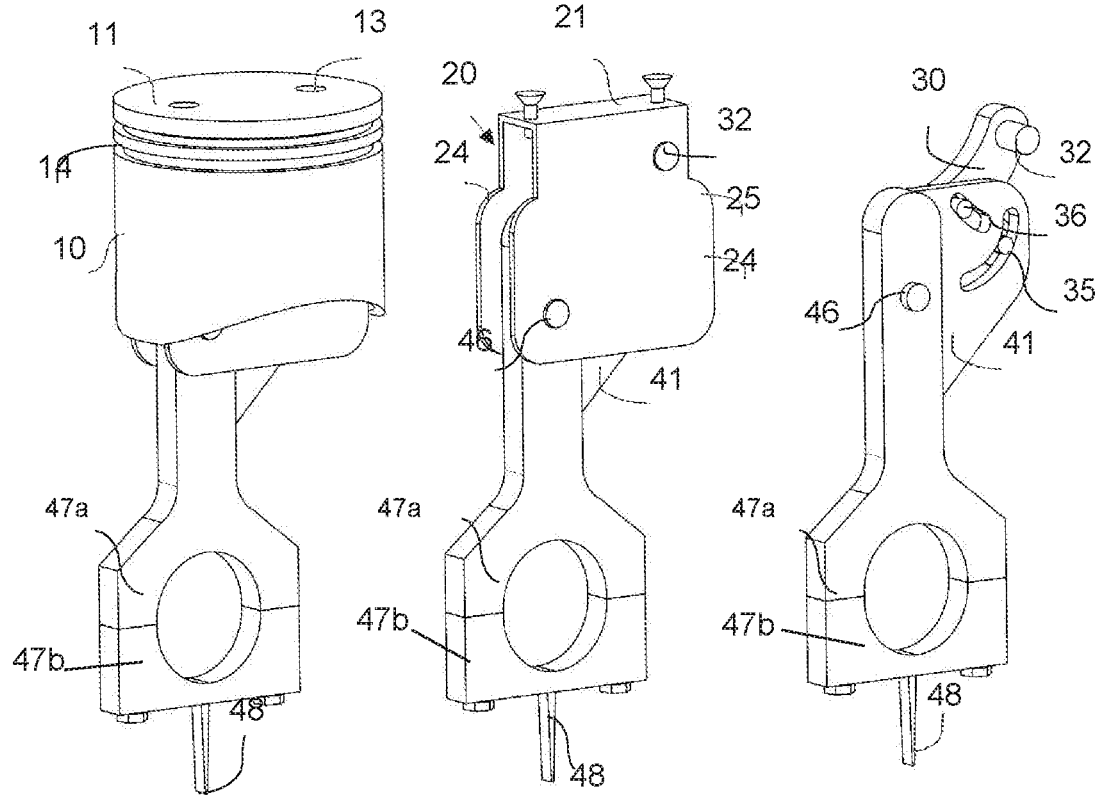
FIGS. 9A-C show front views of the assembly of the piston and connecting rod showing the different components.
Figure 10:
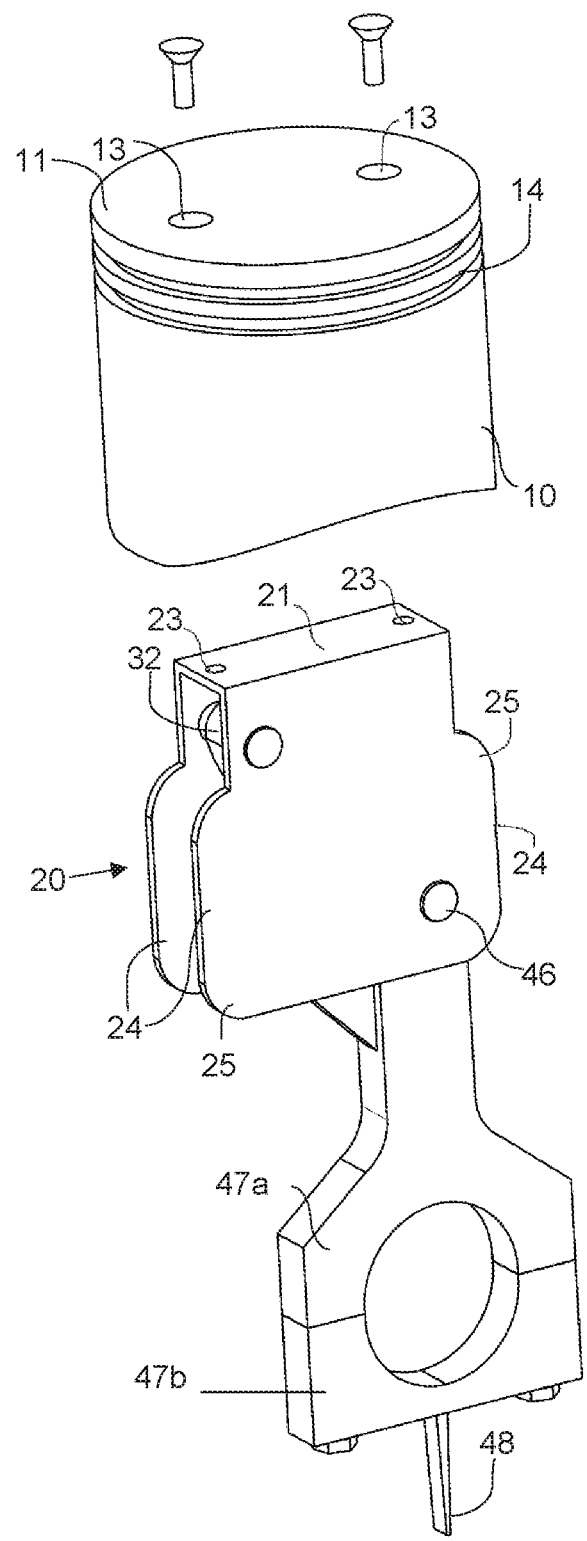
FIG. 10 shows an exploded perspective front view of the piston and connecting rod.
Figures 11A, 11B, 11C, 11D:
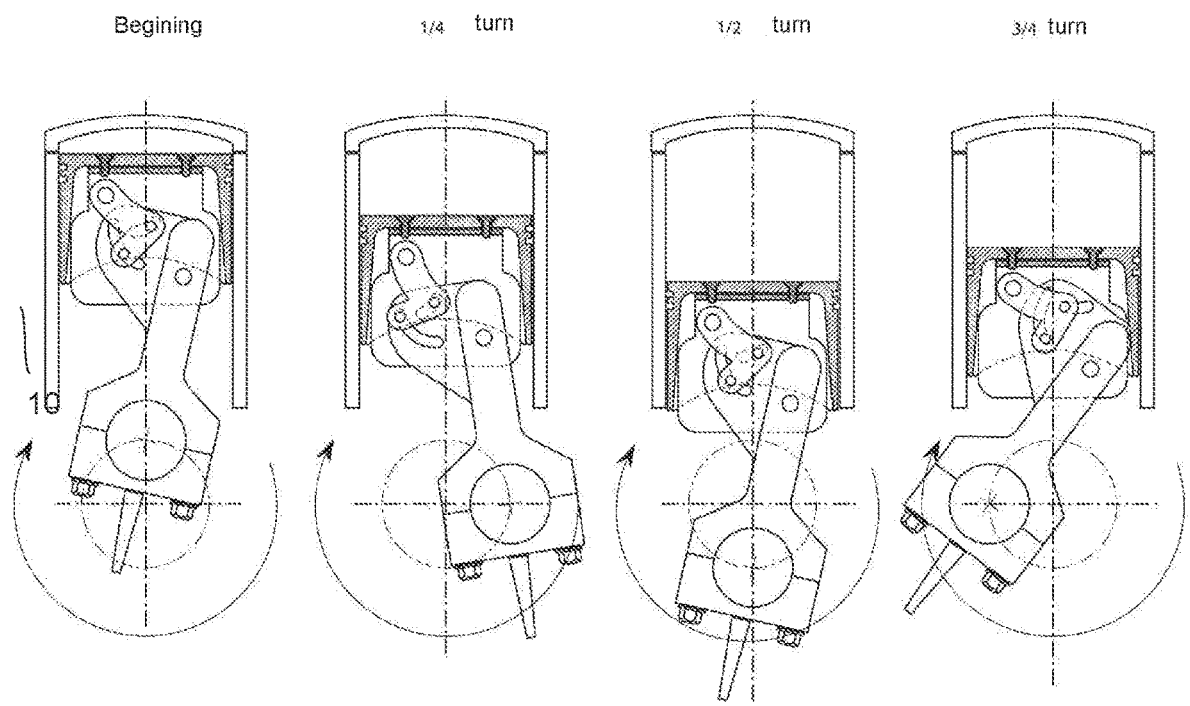
FIGS. 11A-D show views of the piston and connecting rod assembly rotation sequence.

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates.

The main object of the present invention is to provide a mechanism that has a series of modifications, adaptations and adaptations of a structural nature in specific elements of a connecting rod and a piston of an internal combustion engine, where these modifications lead to changes in the stages of these types of engines, as well as in all the components that participate in these stages or phases, obtaining a series of advantages with their application, such as: lower fuel consumption; obtaining a torque with a higher magnitude derived from a more powerful combustion and; a reduction in polluting emissions that generate a negative environmental impact when they are evacuated from the engine.

In general, the piston and connecting rod assembly to modify the phases of an internal combustion engine, object of the present invention, consists of providing a series of modifications that promote some changes in the natural stages of a combustion engine internal (intake, compression, expansion, and exhaust), as mentioned below:

i: in the intake stage, there is a greater opening of the intake valves at the beginning of the cycle and consequently there is a lower resistance to the entry of gases;

ii: in the compression stage, the residence time in the upper dead center of the piston is increased, therefore, by increasing this temporary variable, that ends up producing a better emulsification of the air/fuel mixture due to the longer residence time with high pressure. Also, there is a reduction in energy expenditure because ignition does not start before upper dead center as in conventional engines;

iii: in the explosion or expansion stage, the application of force is carried out at a point of greater efficiency, which is why said force is increased in magnitude by having a more efficient explosion; and iv: in the exhaust stage, it is achieved that the exit of the residual gases is carried out with greater efficiency by the longer stay of the piston at bottom dead center, thus achieving optimization in all stages of an internal combustion engine.

For the present invention, a series of special configurations are available, mainly in the connecting rod and piston portions of a cylinder of an internal combustion engine, having their shape and placement different from conventional models for an engine of this type.

There is a configuration that provides a location for the foot of a connecting rod 40 that has a misalignment with respect to the axial axis of the cylinder and a piston 10, therefore having a location at the upper dead center of the piston with respect to the cylinder and at the same time promoting an inclination of the connecting rod inclined with respect to the axial axis of the piston and the cylinder, so that it does not allow the tilting movement of the piston, keeping the piston in its movement parallel to the vertical axis of the cylinder, attached to the connecting rod chassis assembly by means of two arms, one of fixed length and the other of dynamically variable length.

In a conventional engine, the alignment between the connecting rod and the crankshaft arm is at 0° from the vertical axis.

The present invention includes 2 support points for the piston with the connecting rod, one offset from the vertical axis in the direction of rotation and the other on the opposite side, avoiding the tilting movement of the piston and managing to keep the piston at upper dead center for longer time than in the conventional engine, while the crankshaft continues to rotate and explodes at an angle of greater mechanical efficiency.

In the present invention as consequence of the proposed modification of the new support points, the alignment is displaced in the direction of rotation of the crankshaft, increasing in this way the time that the piston stays at the upper dead point, which changes all of the parameters during that period, such as greater power, optimization of the emulsion fuel, and less pollution. The same also occurs at the bottom dead point where the parameters are also optimized, such as gas escapes, improve intake, and less power consumption.

The general arrangement of the piston and connecting rod assembly is composed in its most general aspect by the incorporation of a piston 10 which has a coupling chassis 20 in its internal part, which in turn has a series of arrangements that allow the coupling of a connecting rod 40.

As can be seen in the figures, the piston and connecting rod assembly object of the present invention is integrated by the arrangement of a piston 10 located in the upper part of the assembly, where said piston 10 has a preferably circular cross section, defining an upper surface 11 and a lower part 12, where for the upper part there is the incorporation of a pair of holes 13, arranged in the middle part of the upper surface 11, where these are placed in an area close to the periphery thereof and which in their internal part have a threading that allows the coupling of fastening or joining means. In the piston 10, there are also a plurality of grooves 14 that have a preferably square section that promotes a space for the insertion of a series of piston rings (not shown) to maintain cylinder pressure and the eventual combustion. In addition to the fact that this set of grooves in conjunction with the rings are responsible for keeping the contact point of the piston and the cylinder (not shown) lubricated. In the lower part of the piston 10, there is an internal recess 15 that is coincident with the shape of the piston and that generates a space for the entrance of a coupling chassis 20, which is coupled with the upper surface 11 of the piston 10 by means of a series of joining means 16, for example, bolts or screws.

The coupling chassis 20 has an inverted U-shaped cross section and includes an upper plate 21 and two side plates 22. The upper plate 21 may have an overall rectangular shape and a pair of holes 23 on its surface whose axial axes are coincident with the axial axes of the passed hole 13 of the upper part of the piston 10. The holes 23 also have an internal thread that allows the insertion of a series of joining means that promote a more solid hold between these components.

The side plates 22 are arranged on the longest faces of the upper plate 21 having a downward orientation and that are in an area proximal to its upper part, they have a face enlargement 24 which includes round edges 25.

The coupling chassis 20 is oriented to cover the internal walls of the piston 10 and thus achieve a greater contact area for the transmission of the force applied by combustion.

Each one of the side plates 22 include a pair of side holes 26 that coincide with the diagonals of the side plate 22 where they are located, providing a lateral bore in areas close to the top and bottom of these side plates 26.

The pivoting support 30 has an L-shaped section and a plurality of holes in its surface. The upper part has an upper hole 31 for the insertion of a connector chassis 32 that joins the pivoting support 30 with the coupling chassis 20 through one of the side holes 26. In the lower part of the pivoting support, specifically in the portion perpendicular to the bar where the upper hole 31 is located, there are an upper channel hole 33 and a lower channel bores 34 that are eventually used for the insertion and adjustment of an upper channel shaft 35 and a lower channel shaft 36.

The connection between the connecting rod 40 and the pivoting support 30 takes place in a connecting rod extension 41 that is located in the upper part of the connecting rod 40.

The connecting rod 40 comprises an upper section 47a, a lower section 47b, a side plate 42, and an oil splatter 48.

The upper section 47a has a Y-shape including a handle 47c and 2 split ends 47d and with a semicircular split angle between the split ends 47d.

The handle 47c includes a central bore 45 in its upper end. The central bore 45 connects to a rod 46 that connects the connecting rod shaft with the side plates 26 located in the lower part of the face of the chassis 10, ending the connection between these two components of the invention.

The lower section 47b has a U-shape with a semicircular angle between the split legs 47e of the U-shape.

The split legs of the lower section 47b connect via fastening devices 50 to the split ends 47d, the upper section 47a forming an opening 49 having a circular shape.

The circular opening 50 allows for the connection of the connecting rod 40 to the crankshaft of an engine.

The side plate 42 is laterally connected to the upper end of the upper section 47a of the connecting rod 40 and that extends to an area proximal to the middle part of it, defining a globally triangular shape that has a rounding 42 at one of its vertices, also having a pair of past-type channels on its surface, an upper channel 43 and a lower channel 44, where first the upper channel 43 is arranged in an area close to the upper middle part of the connecting rod extension having an oval shape with a curved portion in the middle part and having a downward orientation and directed towards the opposite side of the axis of the connecting rod, while the lower channel 44 also has a generally oval shape, with a curved portion in its middle part and which has a length of at least one higher order, preferably two higher orders with respect to the lower channel 44 and whose orientation is disengaged and directed towards the axis of the connecting rod.

Although a preferred exemplary embodiment is shown and specified in detail in the drawings and the preceding specification, these should be viewed as purely exemplary and not as limiting the invention. It is noted in this regard that only the preferred exemplary embodiment is shown and specified, and all variations and modifications should be protected that presently or in the future lie within the scope of protection of the invention as defined in the claims.

The invention claimed is:

1. A connecting rod for an internal combustion engine, the connecting rod including:
    an upper section having an upper end, a middle section, and a lower end;
    a lower section;
    a side plate laterally connected to the upper end of the upper section and extending to the middle section of the upper section;
    an oil splatter;
    wherein the upper section has a Y-shape including a handle and two split ends with a semicircular split angle between the split ends;
    wherein the handle includes a central bore in an upper end;
    wherein the lower section has a U-shape with a semicircular angle between split legs of the U-shape;
    wherein the split legs of the lower section connect via fastening devices to the split ends, the upper section forming an opening having a circular shape;
    wherein the side plate has a triangular shape having one rounded shaped vertices, an upper end, a middle section, and a lower end;
    wherein the side plate includes an oval shaped upper channel located on the upper end of the side plate and an oval shaped lower channel located on the middle section of the side plate;
    wherein the oval shaped upper channel has a curved middle section oriented away from an axis of the connecting rod;
    wherein the oval shaped lower channel has a curved middle section oriented towards the axis of the connecting rod;
    wherein the circular opening is adapted to connect with a crankshaft of an engine.

2. A combination of a piston and connecting rod integrated in a cylinder of an internal combustion engine, the combination comprising:
    a piston;
    a coupling chassis having a first side connected to the piston;
    a pivoting support having a first end connected to a second end of the coupling chassis;
    a connecting rod coupled to a second end of the pivoting support;
    wherein the connecting rod includes an upper section having an upper end, a middle section, and a lower end; a lower section; a side plate laterally connected to the upper end of the upper section and extending to the middle section of the upper section; an oil splatter; wherein the upper section has a Y-shape including a handle and two split ends with a semicircular split angle between the split ends; the handle includes a central bore in an upper end; the lower section has a U-shape with a semicircular angle between split legs of the U-shape; the split legs of the lower section connect via fastening devices to the split ends, the upper section forming an opening having a circular shape; wherein the side plate has a triangular shape having one rounded shaped vertices, an upper end, a middle section, and a lower end; wherein the side plate includes an oval shaped upper channel located on the upper end of the side plate and an oval shaped lower channel located on the middle section of the side plate; wherein the oval shaped upper channel has a curved middle section oriented away from an axis of the connecting rod; wherein the oval shaped lower channel has a curved middle section oriented towards the axis of the connecting rod;
    wherein the circular opening is adapted to connect with a crankshaft of an engine; and
    wherein said chassis connects with the pivoting support coupled to the side plate;
    wherein the connection rod has a first support point with respect to the piston that is offset from a vertical axis in the direction of rotation and a second support point located opposite to the first support point and that avoids a tilting movement of the piston and keeps the piston at upper dead center for longer time than in a conventional engine, while a crankshaft continues to rotate.

3. The combination according to claim 2, wherein the piston has a circular cross section, defining an upper surface and a lower part, wherein the upper surface has a pair of holes arranged in a middle part of the upper surface.

4. The combination according to claim 3, wherein the piston further includes a plurality of piston grooves to receive a plurality of piston rings and internal recess located on a lower section part of the piston, the internal recess coincides with the shape of the piston and that generates a space for the entry of a coupling chassis which is coupled with the upper surface of the piston by fastening devices.

5. The combination according to claim 2, wherein the coupling chassis has an inverted U-shaped cross section, and includes an upper plate and two side plates, the upper plate has a rectangular shape with a pair of through holes whose axial axes coincide with axial holes of the hole of the upper part of the piston, wherein the side plates are arranged on a longest face of the upper plate having a downward orientation and in an area proximal to an upper part of each side plate having a face enlargement with a round edge, wherein the side plates cover internal walls of a piston.

6. The combination according to claim 2, wherein the pivoting support has an L-shaped section, an upper hole to connect to the connector chassis, an upper channel hole on the lower section, and lower channel bores on the lower section.

\* \* \* \* \*